(12) United States Patent
Rubio et al.

(10) Patent No.: US 11,714,308 B2
(45) Date of Patent: Aug. 1, 2023

(54) PORTABLE RADIO WITH THERMAL INSULATION BARRIER

(71) Applicant: MOTOROLA SOLUTIONS, INC., Chicago, IL (US)

(72) Inventors: Adrian F. Rubio, Weston, FL (US); Salvador P. Magana, Wellington, FL (US); David H. McClintock, Boynton Beach, FL (US); William Robertson, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/407,122

(22) Filed: Aug. 19, 2021

(65) Prior Publication Data
US 2023/0059689 A1 Feb. 23, 2023

(51) Int. Cl.
*G02F 1/1333* (2006.01)
*G02F 1/1339* (2006.01)

(52) U.S. Cl.
CPC .... *G02F 1/133345* (2013.01); *G02F 1/13338* (2013.01); *G02F 1/13392* (2013.01)

(58) Field of Classification Search
None
See application file for complete search history.

(56) References Cited

U.S. PATENT DOCUMENTS

| | | | |
|---|---|---|---|
| 5,270,084 A | 12/1993 | Parker | |
| 6,444,281 B1 * | 9/2002 | Wang | E06B 3/66304 52/786.13 |
| 10,662,109 B2 * | 5/2020 | Abe | C03C 27/10 |
| 2017/0060311 A1 | 3/2017 | Hsu | |
| 2017/0300144 A1 * | 10/2017 | Garcia | H04M 1/0266 |

FOREIGN PATENT DOCUMENTS

| | | |
|---|---|---|
| CN | 207252077 U | 4/2018 |
| CN | 210864258 U | 6/2020 |
| FR | 2816447 A1 | 5/2002 |

(Continued)

OTHER PUBLICATIONS

EPRUI Biotech Co. Ltd., "Polymer Spacer," <https://www.epruibiotech.com/product/polymer-spacer/> publicly available at least as early as Oct. 20, 2020.

(Continued)

*Primary Examiner* — Richard H Kim
(74) *Attorney, Agent, or Firm* — Michael Best & Friedrich LLP

(57) ABSTRACT

A portable radio includes a housing having a front display. The front display includes a liquid crystal display structure, a first layer of touch panel rear glass disposed exterior to the liquid crystal display structure, and a second layer of touch panel front glass disposed exterior to the first layer of touch panel rear glass. The second layer of touch panel front glass provides a viewable surface and user interface. The front display also includes a vacuum layer disposed between the first layer of touch panel rear glass and the second layer of touch panel front glass, and a plurality of spacers disposed in the vacuum layer that maintain a gap. The front display also includes a seal that at least partially seals and maintains a vacuum within the vacuum layer.

19 Claims, 3 Drawing Sheets

(56) References Cited

FOREIGN PATENT DOCUMENTS

| JP | 2003022027 A | 1/2003 |
|---|---|---|
| JP | 2004070163 A | 3/2004 |
| KR | 20000001031 A | 1/2000 |
| KR | 20030043953 A | 6/2003 |
| TW | M378367 U | 4/2010 |
| TW | 201904305 A | 1/2019 |

OTHER PUBLICATIONS

Crystec, "LCD Equipment Crystec Technology Trading GmbH," <https://crystec.com/secovere.htm> publicly available at least as early as Jun. 3, 2021.
International Search Report and Written Opinion for Related Application No. PCT/US2022/074771 dated Nov. 23, 2022 (14 pages).

* cited by examiner

PORTABLE RADIO WITH THERMAL INSULATION BARRIER

BACKGROUND OF THE INVENTION

Portable radios typically include internal circuitry, such as radio circuitry operating in radio frequency bands, that generates heat within the portable radio. The heat may cause a front display area and radio user interface of the portable radio to become warm over time. High temperatures along the front display area and radio user interface may cause discomfort and become a nuisance for an end user. Additionally, some portable radios are used by personnel (for example firefighters or other emergency personnel) within environments that have extreme heat. High temperatures in the environment outside of the portable radio may cause the portable radio itself to become overheated.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
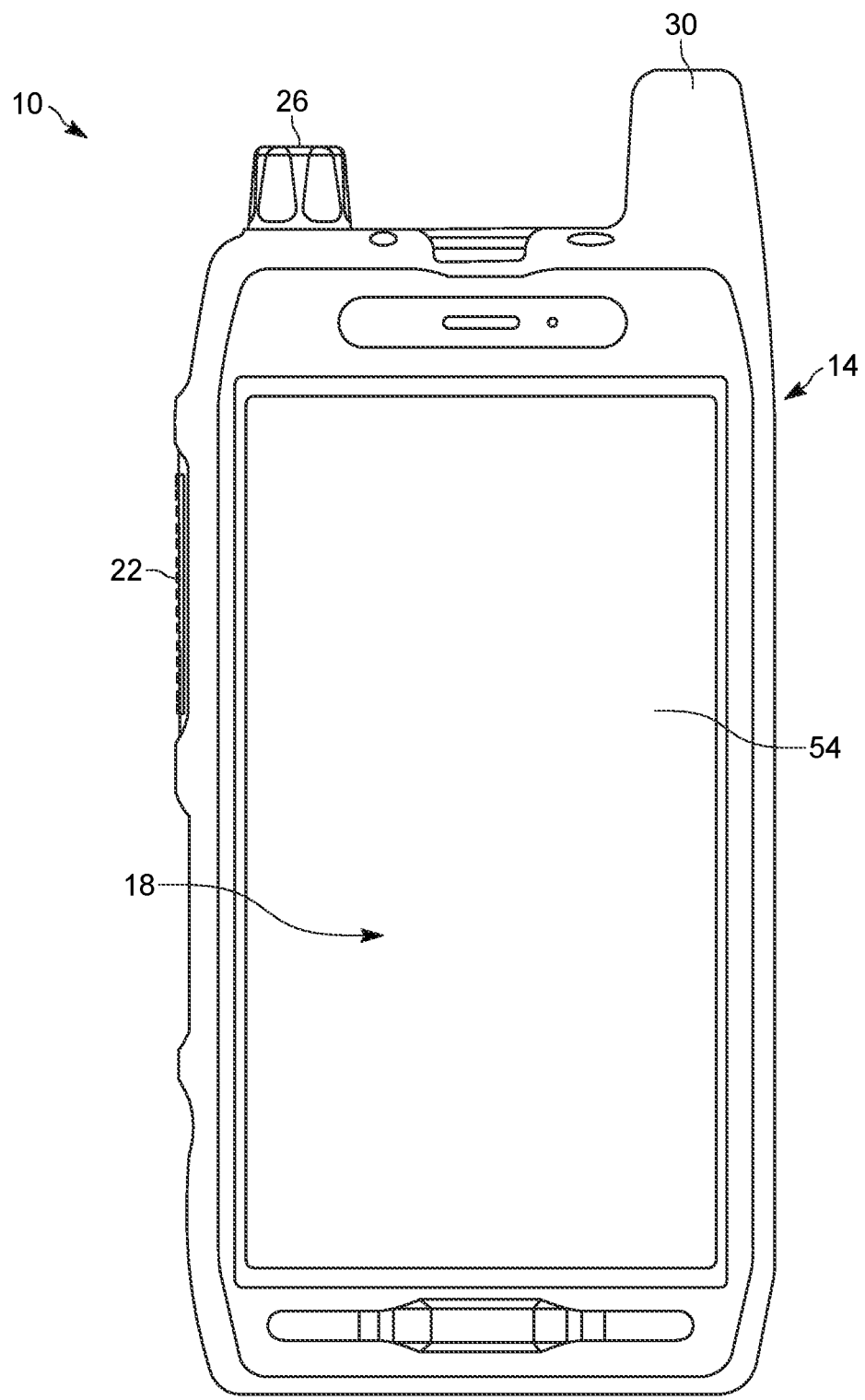
FIG. 1 is a front view of a portable radio in accordance with one embodiment, the portable radio having a front display that includes a touch panel structure and a liquid crystal display.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, portable radios such as those used by emergency personnel often generate heat internally and/or are exposed to high temperature environments. Accordingly, there is a need for an improved portable radio that provides, among other things, a thermal insulation barrier to inhibit the front display area and radio user interface from becoming overheated, and/or a thermal insulation barrier to inhibit heat from an external environment from overheating the interior of the portable radio.

Briefly, there is provided herein an improved portable radio. The portable radio, according to one embodiment, includes a housing having a front display. The front display includes a liquid crystal display structure, a first layer of touch panel rear glass disposed exterior to the liquid crystal display structure, and a second layer of touch panel front glass disposed exterior to the first layer of touch panel rear glass. The second layer of touch panel front glass provides a viewable surface and user interface. The front display also includes a vacuum layer disposed between the first layer of touch panel rear glass and the second layer of touch panel front glass, and spacers disposed in the vacuum layer. The spacers maintain a gap between the first layer of touch panel rear glass and the second layer of touch panel front glass. The front display also includes a seal disposed between the first layer of touch panel rear glass and the second layer of touch panel front glass. The seal at least partially seals and maintains a vacuum within the vacuum layer.

FIG. 1 illustrates a portable radio 10. The portable radio 10 may be used, for example, by firefighters or other emergency personnel, to talk, send messages, or otherwise communicate. The portable radio 10 includes a main housing 14 having a front display 18. In the illustrated embodiment the portable radio 10 also includes a push-to-talk button 22 coupled to the main housing 14 along a side of the main housing 14, a volume adjustment assembly 26 (for example, a knob) coupled to the main housing 14 along a top of the main housing 14, and an antenna 30 coupled (e.g., fixed or otherwise attached) to the main housing 14 along the top of the main housing 14. In other embodiments one or more of the push-to-talk button 22, the volume adjustment assembly 26, and the antenna 30 may be located elsewhere along or within portable radio 10, or for example may be omitted from the portable radio 10.

Figure 3:
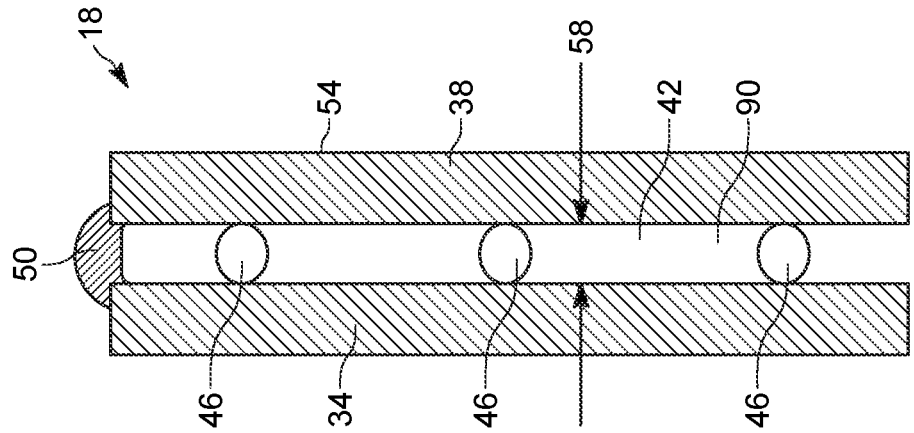
FIG. 3 is a cross-sectional view of the portion of the front display in FIG. 2.
Figure 2:
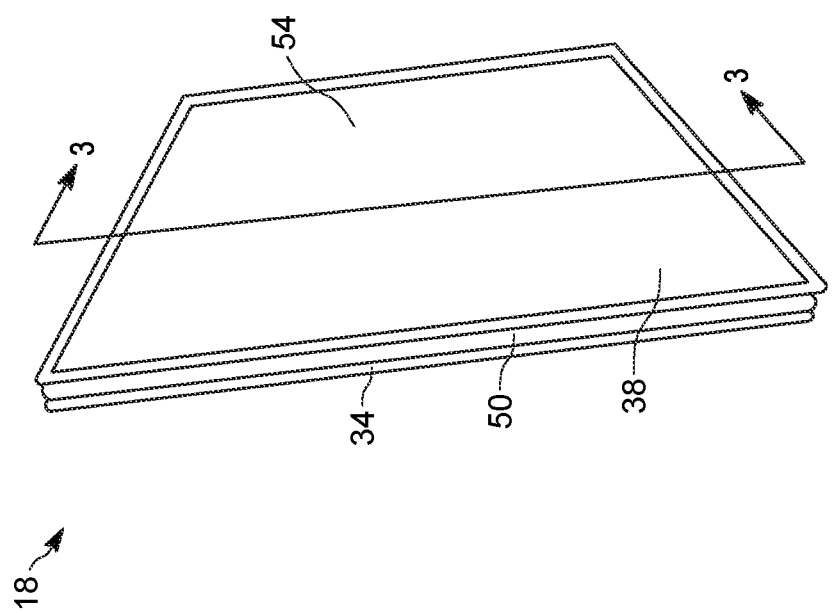
FIG. 2 is a perspective view of a portion of the front display, including a first layer of touch panel rear glass and a second layer of touch panel front glass.

With reference to FIGS. 2 and 3, the front display 18 includes a first layer of touch panel rear glass 34, a second layer of touch panel front glass 38 that is disposed exterior to the first layer of touch panel rear glass 34, and a vacuum layer 42 disposed between the first layer of touch panel rear glass 34 and the second layer of touch panel front glass 38. The front display 18 additionally includes spacers 46 disposed in the vacuum layer 42, and a seal 50 disposed along the perimeter and between the first layer of touch panel rear glass 34 and the second layer of touch panel front glass 38.

With continued reference to FIGS. 2 and 3, in the illustrated embodiment the first layer of touch panel rear glass 34 and the second layer of touch panel front glass 38 are each a rectangular sheet of transparent glass. The rectangular sheet or sheets may have slightly rounded corners and/or edges, but still have straight sides. Other embodiments include different shapes than that illustrated. For example, in some embodiments one or more of the first layer of touch panel rear glass 34 and the second layer of touch panel front glass 38 may have a curved side or sides. Additionally, in some embodiments one or more of the first layer of touch panel rear glass 34 and the second layer of touch panel front glass 38 may be only partially transparent, or opaque.

With reference to FIGS. 1-3, the second layer of touch panel front glass 38 defines a viewable surface and radio user interface 54 for the portable radio 10. For example, during use the second layer of touch panel front glass 38 may display icons, images, text, and/or other elements (for example as part of a graphical user interface of the portable radio 10).

With reference to FIG. 3, the spacers 46 may be positioned to provide structural support within the front display 18, and to maintain a gap 58 between the first layer of touch panel rear glass 34 and the second layer of touch panel front glass 38. In some embodiments the spacers 46 are optically clear spacers. The spacers 46 may have spherical shapes (for example may be optically clear spheres) or other shapes, and may physically contact both the first layer of touch panel rear glass 34 and the second layer of touch panel front glass 38. The number and arrangement of the spacers 46 may vary.

With continued reference to FIG. 3, the vacuum layer 42 defines at least a partial vacuum between the first layer of touch panel rear glass 34 and the second layer of touch panel front glass 38. For example, in some embodiments, the vacuum layer 42 may include approximately 10% air, approximately 15% air, approximately 20% air, or other values and ranges of values, as a perfect vacuum may not be achievable.

With continued reference to FIG. 3, the seal 50 at least partially seals and maintains the vacuum within the vacuum layer 42. In some embodiments, the seal 50 is a hermetic seal. In the illustrated embodiment, the seal 50 is a perimeter seal that extends along a perimeter of both the first layer of touch panel rear glass 34 and a perimeter of the second layer of touch panel front glass 38. The seal 50 extends entirely around both the first layer of touch panel rear glass 34 and the second layer of touch panel front glass 38. The seal 50 may be formed, for example, from an elastomeric material, adhesive, or other suitable material. In other embodiments, more than one seal 50 may be provided, and/or the seal 50 may be positioned at a location other than that illustrated.

Figure 4:
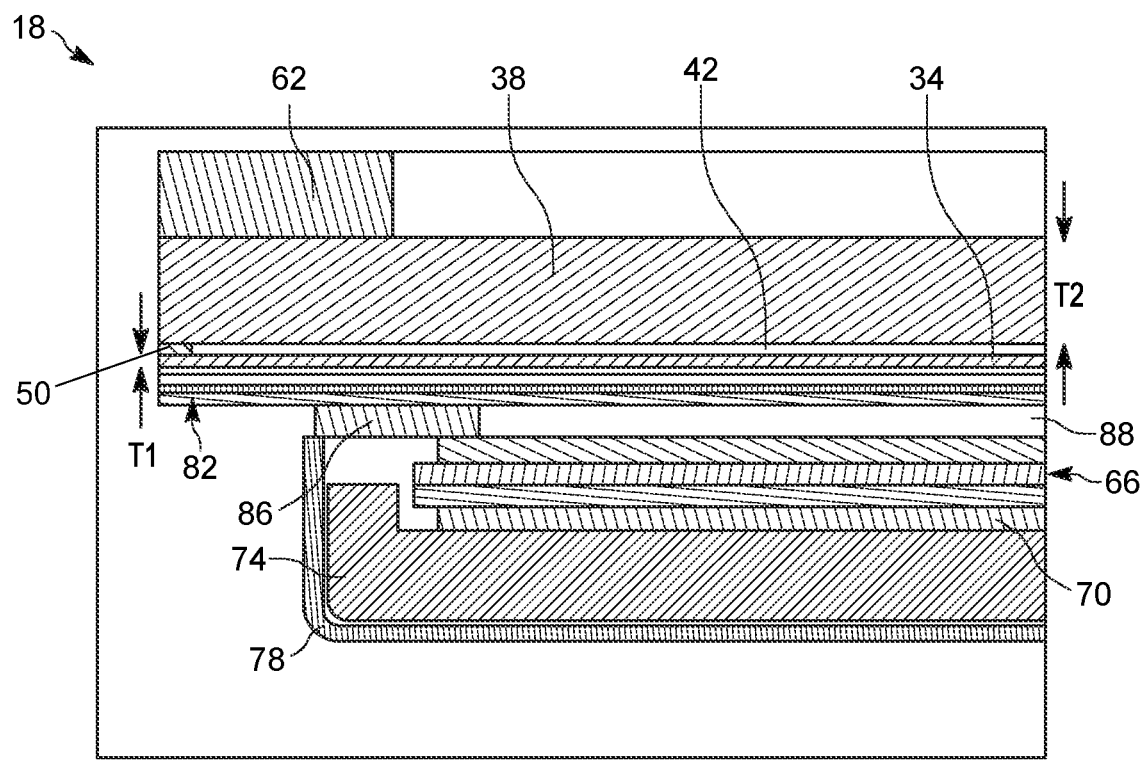
FIG. 4 is a partial cross-sectional view of the front display, illustrating a position of the first layer of touch panel rear glass and the second layer of touch panel front glass within the overall front display.

With reference to FIG. 4, in some embodiments the thickness of the first layer of touch panel rear glass 34 may be different than a thickness of the second layer of touch panel front glass 38. For example, in the illustrated embodiment the first layer of touch panel rear glass 34 has a first thickness T1 and the second layer of touch panel front glass 38 has a second thickness T2 that is greater than the first thickness T1. In some embodiments the second thickness T2 is at least twice as large as the first thickness T1. In other embodiments the second thickness is at least ten times as large as the first thickness T1. The second thickness T2 of the second layer of touch panel front glass 38 may be large enough, for example, such that the portable radio 10 may be able to withstand impacts (for example from being dropped on the ground), without damaging the front display 18, whereas the first thickness T1 of the first layer of touch panel rear glass 34 may be kept smaller to minimize the overall thickness and size of the front display 18.

With continued reference to FIG. 4, the front display 18 may additionally include a protective pad 62 disposed exterior to the second layer of touch panel front glass 38. In the illustrated embodiment the protective pad 62 extends around a perimeter of the front display 18, thereby providing added protection to the overall portable radio 10. The protective pad 62 is coupled directly to a portion of the second layer of touch panel front glass 38, such that an outer surface of the second layer of touch panel front glass 38 is still visible and accessible by a user.

In the illustrated embodiment the front display 18 additionally includes a liquid crystal display structure 66. The liquid crystal display structure 66 may include, for example, multiple liquid crystal display layers positioned within the main housing 14. The liquid crystal display structure 66 may also include a polarizer 70. In the illustrated embodiment, the front display 18 additionally includes a lightguide 74. As illustrated in FIG. 4, the lightguide 74 may be positioned, for example, within a display bezel 78 of the main housing 14 (e.g., within the confines of the main housing 14).

With continued reference to FIG. 4, in the illustrated embodiment the front display 18 further includes a touch panel sensor 82 disposed between the liquid crystal display structure 66 and the first layer of touch panel rear glass 34. The touch panel sensor 82 may also include multiple layers. As illustrated in FIG. 4, the first layer of touch panel rear glass 34 is disposed exterior to both the touch panel sensor 82 and the liquid crystal display structure 66, and is coupled directly to the touch panel sensor 82 (for example with an optically clear adhesive). The touch layers and optical clear adhesives may be implemented as multiple layers. In yet other embodiments, the first layer of touch panel rear glass 34 is coupled directly to the liquid crystal display structure 66, or to another component in the portable radio 10.

With continued reference to FIG. 4, the front display 18 further includes a dust pad 86 disposed between the touch panel sensor 82 and the liquid crystal display structure 66. The dust pad 86 may define an opening 88, such that a gap or space is disposed between the liquid crystal display structure 66 and the touch panel sensor 82.

Other embodiments of the front display 18 may include other numbers or arrangements of components that are coupled to the first layer of touch panel rear glass 34 and/or the second layer of touch panel front glass 38. For example, in some embodiments the front display 18 may not include the dust pad 86, or the protective pad 62, or may include other arrangements of the liquid crystal display structure 66 and/or touch panel sensor 82 than that illustrated.

Additionally, in some embodiments the front display 18 may include more than two layers of touch panel glass. For example, along with the first layer of touch panel rear glass 34 and the second layer of touch panel front glass 38, the front display 18 may also include a third layer of touch panel glass (for example disposed interior to the first layer of touch panel rear glass 34, or exterior to the second layer of touch panel front glass 38). A further vacuum layer may be disposed between the third layer of touch panel glass and the first layer of touch panel rear glass 34 or the second layer of touch panel front glass 38.

With reference to FIGS. 1-4, the vacuum layer 42 defines a thermal insulation barrier 90 (FIG. 3), also defined by the gap 58, protecting the radio user interface 54 from heat generated internally within the portable radio 10. In some embodiments, the portable radio 10 may include heat-dissipating circuitry disposed within the housing (including for example circuitry related to the liquid crystal display structure 66 and/or the touch panel sensor 82, and/or radio circuitry in general that is configured to operate in radio frequency bands), or may otherwise include components that generate heat. The thermal insulation barrier 90 protects the radio user interface 54 from heat generated by the heat-dissipating circuitry. In some embodiments, the thermal insulation barrier 90 may reduce a temperature of the radio user interface 54 by at least eight degrees (as compared to a device that does not include the thermal insulation barrier 90). In other embodiments the temperature reduction may be more or less, depending for example on the dimension of the gap 58 and percentage of air content in the vacuum layer 42.

Additionally, the thermal insulation barrier 90 may also protect an interior of the portable radio 10 from heat generated externally of the radio user interface 54. For example, as described above, the portable radio 10 may be used by emergency personnel in environments where high temperatures are present (for example near a fire).

While the first layer of touch panel rear glass 34, the second layer of touch panel front glass 38, the vacuum layer 42, the spacers 46, and the seal 50 are described in the context of the illustrated portable radio 10, these components may also or alternatively be used with front displays of other types of portable communication devices as well, other than a portable radio (for example with cellular phones, tablets, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A portable radio comprising:
a radio housing having a front display, the front display comprising:
a liquid crystal display structure;
a first layer of touch panel rear glass disposed exterior to the liquid crystal display structure;
a second layer of touch panel front glass disposed exterior to the first layer of touch panel rear glass, and configured to provide a viewable surface and radio user interface;
a vacuum layer disposed between the first layer of touch panel rear glass and the second layer of touch panel front glass;
a plurality of spacers disposed in the vacuum layer, wherein the spacers are configured to maintain a gap between the first layer of touch panel rear glass and the second layer of touch panel front glass in the portable radio; and
a seal disposed between the first layer of touch panel rear glass and the second layer of touch panel front glass, wherein the seal is configured to at least partially seal and maintain a vacuum within the vacuum layer;
wherein the front display further includes a protective pad disposed exterior to the second layer of touch panel front glass, and a touch panel sensor disposed interior to the first layer of touch panel rear glass, wherein the first layer of touch panel rear glass has a first thickness and the second layer of touch panel front glass has a second thickness, wherein the second thickness is greater than the first thickness, wherein the front display further includes a dust pad disposed interior to the touch panel sensor, wherein the dust pad defines an opening, wherein the liquid crystal display structure is disposed interior to the dust pad and the opening, wherein the front display further includes a display bezel, and a lightguide positioned within the display bezel, wherein the display bezel and the lightguide are disposed interior to the dust pad and the opening.

2. The portable radio of claim 1, wherein the vacuum layer is configured to provide a thermal insulation barrier protecting the radio user interface from heat generated internally within the portable radio.

3. The portable radio of claim 2, further comprising heat-dissipating circuitry disposed within the radio housing, wherein the thermal insulation barrier is configured to protect the radio user interface from heat from the heat-dissipating circuitry.

4. The portable radio of claim 3, wherein the heat-dissipating circuitry includes radio circuitry configured to operate in radio frequency bands.

5. The portable radio of claim 2, wherein the thermal insulation barrier is configured to reduce a temperature of the radio user interface.

6. The portable radio of claim 5, wherein the thermal insulation barrier is configured to reduce the temperature by at least eight degrees.

7. The portable radio of claim 2, wherein the thermal insulation barrier is configured to protect an interior of the portable radio from heat generated externally of the radio user interface.

8. The portable radio of claim 1, wherein the front display further includes a touch panel sensor disposed between the liquid crystal display structure and the first layer of touch panel rear glass.

9. The portable radio of claim 8, wherein the first layer of touch panel rear glass is coupled directly to the touch panel sensor with an optically clear adhesive.

10. The portable radio of claim 8, wherein the front display further includes a dust pad disposed between the touch panel sensor and the liquid crystal display structure.

11. The portable radio of claim 1, wherein the first layer of touch panel rear glass is coupled directly to the liquid crystal display structure.

12. The portable radio of claim 1, wherein the seal is a hermetic seal.

13. The portable radio of claim 1, wherein the seal is a perimeter seal that extends along a perimeter of both the first layer of touch panel rear glass and a perimeter of the second layer of touch panel front glass.

14. The portable radio of claim 1, wherein the plurality of spacers are optically clear spacers.

15. The portable radio of claim 14, wherein the plurality of spacers are optically clear glass spheres.

16. The portable radio of claim 1, wherein the first layer of touch panel rear glass has a first thickness and the second layer of touch panel front glass has a second thickness, wherein the second thickness is different than the first thickness.

17. The portable radio of claim 16, wherein the second thickness is at least twice as large as the first thickness.

18. The portable radio of claim 17, wherein the second thickness is at least ten times as large as the first thickness.

19. The portable radio of claim 1, wherein the first layer of touch panel rear glass is rectangular in shape and wherein the second layer of touch panel front glass is rectangular in shape.

* * * * *